Figure 1:
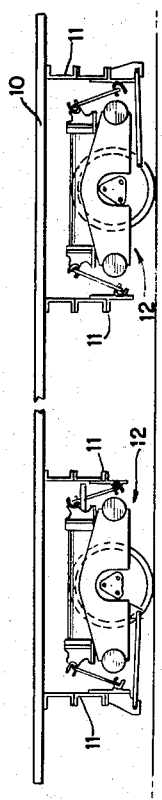

Aug. 25, 1959  J. R. FURRER ET AL  2,900,924
VEHICLE TRUCK

Filed June 13, 1956  4 Sheets-Sheet 1

INVENTOR.
John R. Furrer
BY  Gerd Runken

Robert A. Shield
ATTORNEY

Aug. 25, 1959  J. R. FURRER ET AL  2,900,924
VEHICLE TRUCK
Filed June 13, 1956  4 Sheets-Sheet 3
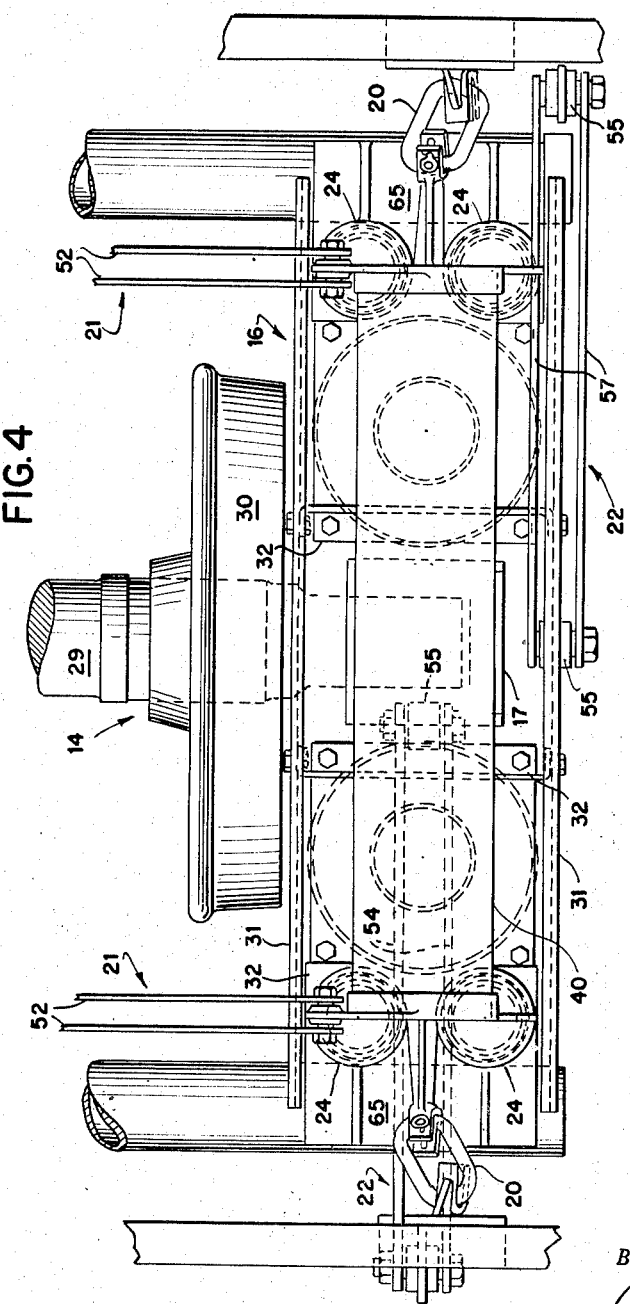
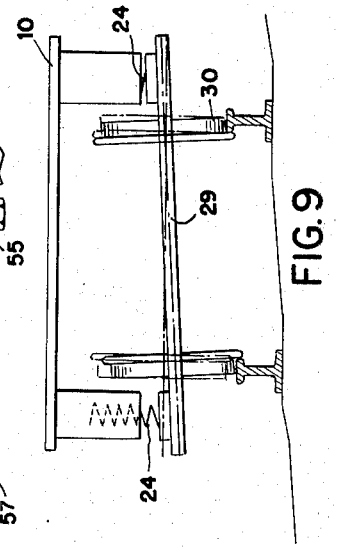
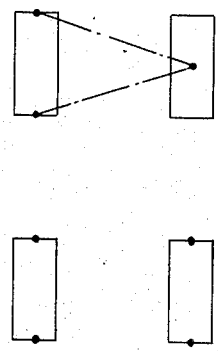
INVENTOR.
John R. Furrer
Gerd Runken
BY
ATTORNEY Aug. 25, 1959   J. R. FURRER ET AL   2,900,924
VEHICLE TRUCK
Filed June 13, 1956   4 Sheets-Sheet 4

INVENTOR.
John R. Furrer
Gerd Runken
BY
Robert A. Shields
ATTORNEY

United States Patent Office 2,900,924
Patented Aug. 25, 1959

2,900,924

VEHICLE TRUCK

John R. Furrer, Bronxville, and Gerd Runken, Cold Spring, N.Y., assignors to ACF Industries, Incorporated, New York, N.Y., a corporation of New Jersey Application June 13, 1956, Serial No. 591,095

21 Claims. (Cl. 105—199)

This invention relates to vehicle trucks, and, more particularly, to rail vehicle trucks of the type which are bolsterless and support the vehicle body structure by means of resiliently mounted hangers.

Heretofore, in order to obtain desired running characteristics, rail vehicle trucks have generally been extremely large, heavy and complex in construction. These features necessitated high initial cost and rendered maintenance expensive. The weight of such trucks also contributed to high gross weights and consequent fuel consumption.

Accordingly, an object of the present invention is to provide a vehicle truck which eliminates or minimizes the foregoing difficulties and disadvantages.

Another object is to provide such a truck which is relatively light in weight, inexpensive to manufacture, and is compact and simple in construction.

A further object is to provide such a truck which requires little maintenance and which provides easy access to the various parts for inspection and replacement.

A still further object is to provide such a truck having desired running characteristics such as ability to operate efficiently and reliably while transmitting a minimum of shock and vibration at high as well as at low speeds.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects may be accomplished by providing a vehicle body supporting truck comprising a wheel and axle assembly, spaced side frames mounted by journal bearings at each end of the assembly, pneumatic spring means including a vertically yieldable chamber supported by each of the side frames, rigid chamber means associated with each of the chambers and in communication therewith, and hanger means pivotally mounted on the rigid chamber means for supporting the vehicle body structure therefrom.

In the present illustrative embodiment the pneumatic spring means supported by each of the side frames comprises a plurality of vertically yieldable chambers and the rigid chamber means is disposed above and in communication with each such chamber to provide a pneumatic reservoir therefor. Each rigid chamber means includes brackets at each end thereof for pivotally mounting the hanger means which support the vehicle body structure. In order to provide additional pneumatic reservoirs, the end pieces of the truck frame are tubular or hollow members having closed ends and each end piece communicates with one set of chambers. Additional means are provided to control movement and stability as will be described hereinafter.

Figure 2:
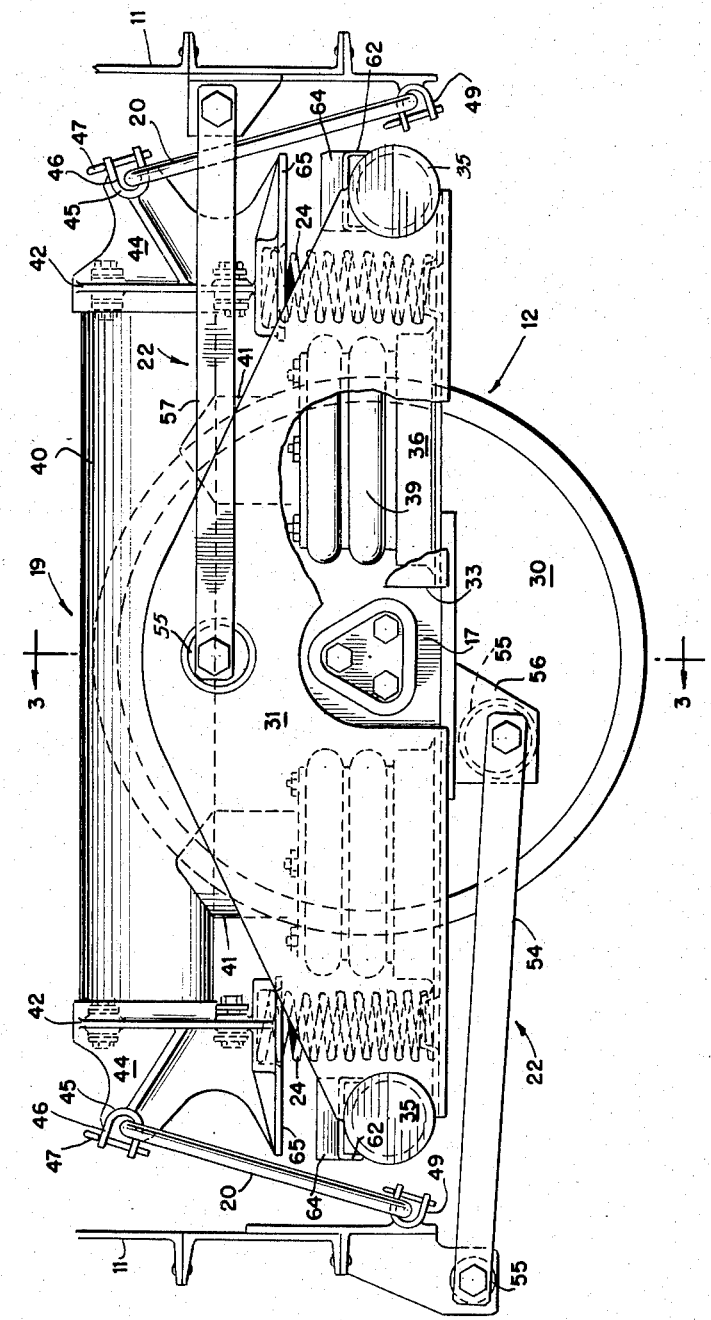
Figure 3:
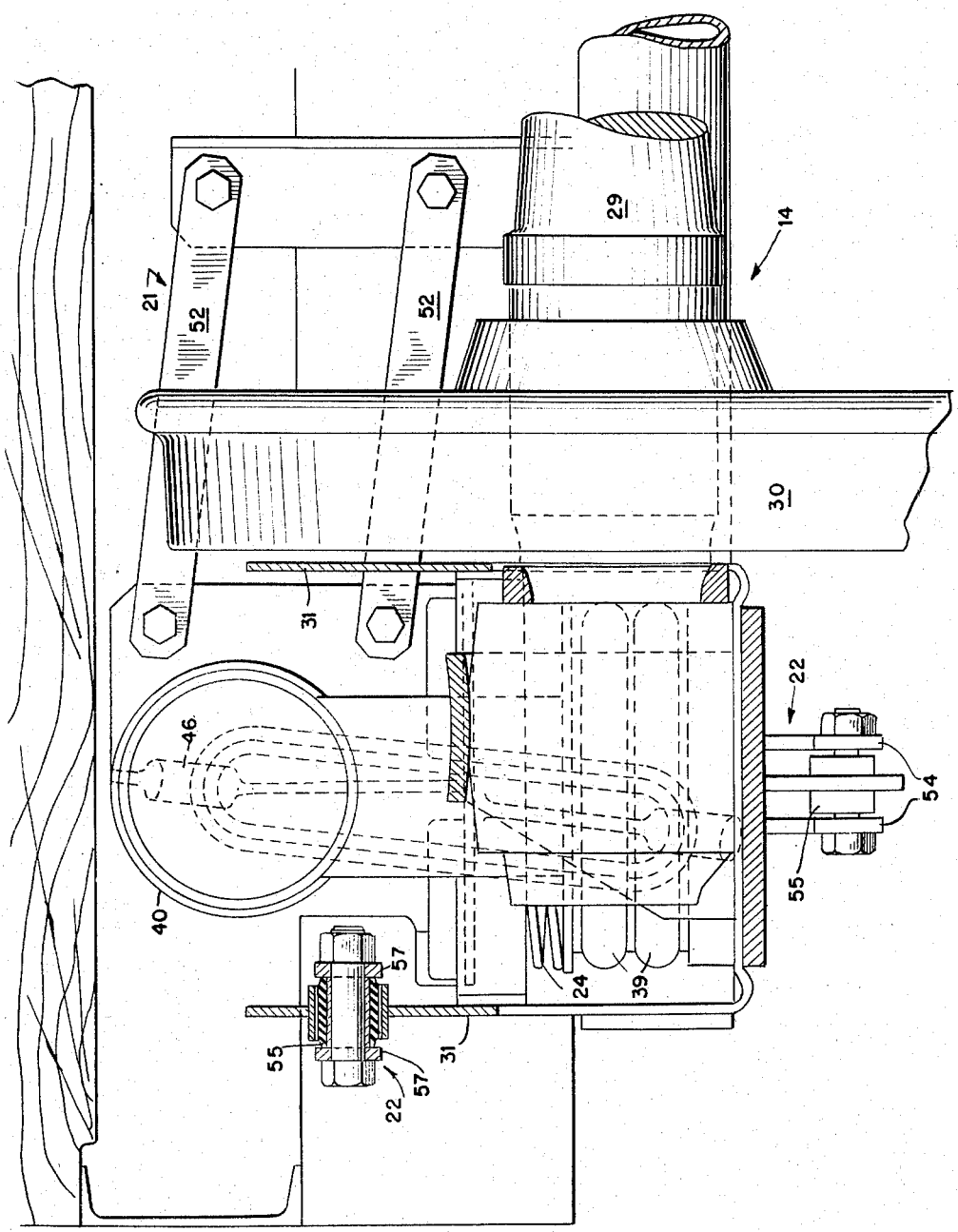
Figure 6:
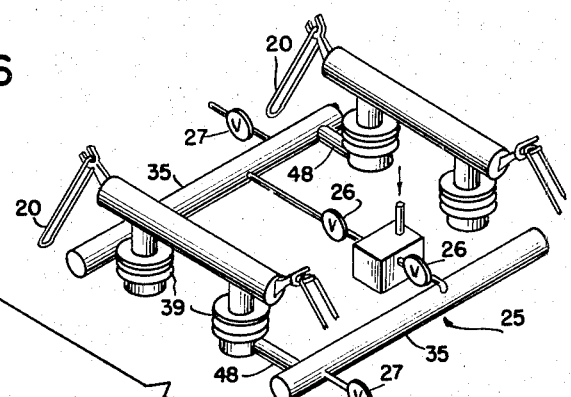
Figure 5:
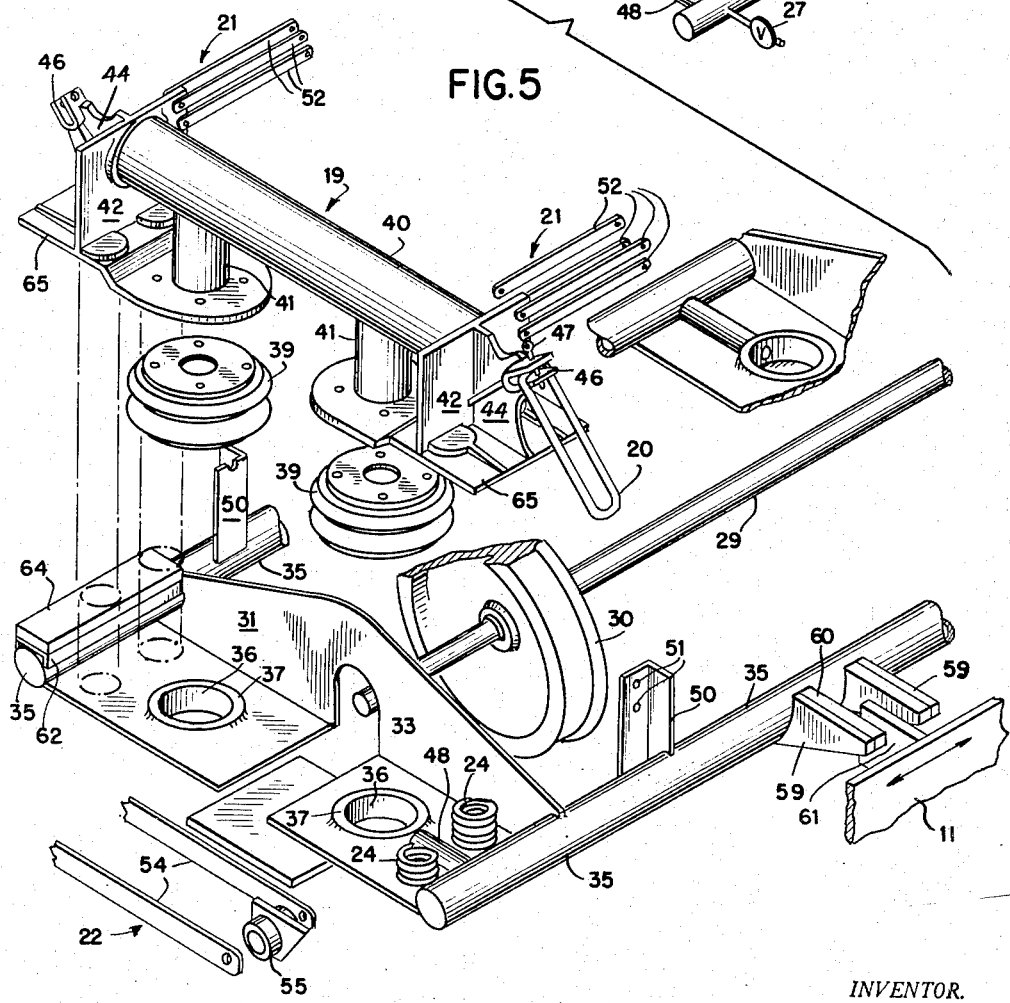

A preferred embodiment of the invention has been chosen for purposes of illustration and description, and is shown in the accompanying drawing, forming a part of the specification, wherein:

Fig. 1 is a fragmentary elevational view of portions of a flat car illustrating trucks in accordance with the present invention, Fig. 2 is an elevational view of a vehicle truck of the type shown in Fig. 1 having a portion of the side frame broken away to better illustrate part of the pneumatic spring means, Fig. 3 is a fragmentary sectional view taken along the line 3—3 of Fig. 2, Fig. 4 is a plan view of a portion of the truck shown in Figs. 1 and 2 illustrating portions of the spring means and the manner of suspending the body structure, Fig. 5 is a fragmentary, perspective explosion view illustrating portions of the truck made in accordance with the present invention, Fig. 6 is a diagrammatic view of a pneumatic suspension system of a type which may constitute a portion of the truck of the present invention, Fig. 7 is a schematic view of the pneumatic spring means of a two truck railway car arranged for four point suspension, Fig. 8 is a schematic view of the pneumatic spring means arranged for three point suspension, and Fig. 9 is a schematic end view of a rail vehicle illustrating the operation of the truck of the present invention to maintain the car wheels in engagement with uneven tracks.

Referring to the drawing in detail, there is shown in Fig. 1 a vehicle having a body structure 10, shown as a flat car by way of example, having a pair of depending members 11 adjacent each end thereof by which the body structure is supported by a pair of trucks 12 which have been chosen to illustrate the present invention.

As shown in Figs. 2 to 5, the trucks 12 each include a wheel and axle assembly 14, a truck frame including spaced side frames 16 mounted by journal bearings 17 at each end of the assembly 14, pneumatic spring means 19 supported by each of the side frames 16 and swing hangers 20 mounted on the pneumatic spring means for supporting the vehicle body structure 10 therefrom.

In order to improve running characteristics, stabilizing means 21 are associated with the pneumatic spring means 19; vertical movement control means 22, which also serve as body structure longitudinal movement restraining means, are provided and metallic, helical springs 24 extend between portions of the side frames and the pneumatic spring means, all of which will be more specifically described hereinafter as to both function and structure.

As shown in Fig. 6, the pneumatic spring means 19 may constitute part of a suspension system 25 which includes pressures supply means (not shown), such as a compressor, charging valves 26, vent valves 27 and suitable conduit interconnecting the various portions of the system, as will be discussed hereinafter.

The wheel and axle assembly 14 is a single-axle unit wherein an axle 29 has a wheel 30 journalled at each end thereof in the conventional manner.

The truck frame includes the spaced side frames 16, each of which in turn includes a pair of closely spaced, parallel, generally yoke-shaped plates 31 connected by suitable connecting members 32, as shown in Fig. 4. The plates 31 are each formed, at their lower edges, with a central, inverted, U-shaped recess 33 for reception of the journal bearings 17 by which the side frames are mounted at each end of the wheel and axle assembly 14. Corresponding ends of the side frames are connected by truck end pieces 35 which are of tubular construction.

As best illustrated in Fig. 5, the pneumatic spring means 19 includes a vertically disposed cylindrical housing 36, closed at its lower end and formed with an exterior, annular flat 37 at its upper end disposed at each end of each side frame between the plates 31. Conventional vertically yieldable flexible walled chambers or bellows 39 are mounted on each of the housings 36 by bolts extending through suitable apertures in the flats 37 therein. The interior of each of the bellows 39 is in direct communication with the cylindrical housing 36 upon which it is mounted.

The pneumatic spring means 19 also includes chamber means which comprise a pair of rigid, tubular, elongated and horizontally extending members 40, illustrated as being cylindrical in contour, each having its longitudinal axis in a vertical plane perpendicular to the axis of the axle 29. Each tubular member 40 extends over the pair of bellows on one side of the truck and is formed with a pair of depending conduits 41 each of which is flanged and joined by bolts, for example, to the upper end of one of the bellows 39 for support thereby and to establish communication between the bellows and the chamber or reservoir constituting the interior of the tubular member thereabove. Each end of the tubular members is closed by an integral end plate 42 thereacross formed with an outwardly extending fin 44 having an upwardly and outwardly directed U-shaped recess 45 for receiving a U-shaped hook member 46. The arms of the hook members are apertured to receive bolts 47. To provide separate, additional reservoir volume for each set of bellows, one of the housings 36 on each side of the truck, disposed in diagonal relationship, communicates with the interior of its adjacent end piece 35 by means of a conduit 48, disposed between the plates 31 of each side frame, as best shown in Figs. 5 and 6.

The hangers 20 are each closed, oblong links pivotally mounted, at one end thereof, in one of the hook members 46. At the other end thereof, each such link, or hanger is pivotally engaged by a similarly formed but oppositely directed hook member 49 affixed to the depending members 11 of the car body structure 10 so that the body structure is supported by the hangers 20 from the trucks 12.

As shown in Figs. 3, 4 and 5, the stabilizing means 21 includes four vertical posts 50, each of which is formed of a section of angle iron welded to one of the end pieces 35 just inboard of the wheels 30 so that each post is disposed at a different corner of an imaginary rectangle. A pair of vertically aligned apertures 51 are provided adjacent the upper end of one of the flanges of each angle iron constituting the posts 50; and each such aperture serves to receive a stud for pivotally mounting one end of a pair of link members 52, one on each side of the post flange. The opposite ends of the link members 52 are similarly pivotally mounted on studs extending through suitable apertures adjacent the inboard edges of the end plates 42.

The vertical movement control means 22 comprises a pair of parallel links or arms 54 pivotally mounted at one end, by a resilient bushing 55, to the lower portion of the outer depending members 11, and at the other end, by a similar resilient bushing 55, to a depending tab 56 secured to the lower central portion of each side frame 16. The outboard plate 31 of each side frame is also fitted with a resilient bushing 55, having its center in the vertical plane of the longitudinal axis of the axle 29, for pivotally mounting one end of a similar pair of links or arms 57, the other end of which is similarly pivotally mounted on the adjacent inner depending member 11.

The suspension system 25 includes the pneumatic means 19, together with the charging and vent valves 26 and 27 and a source of supply. As shown in Fig. 6, the pneumatic means 19 may be charged with suitable pneumatic medium by establishing communication between a source of supply (not shown) and the interior of the end pieces 35 through suitable conduits interrupted by charging valves 26. Each end piece is also provided with conduit sections controlled by vent valves 27.

In operation, the pneumatic suspension system is charged with pneumatic pressure medium to the desired pressure until the bellows expand under the influence thereof. Charging of the bellows, of course, raises the tubular members 40, the hangers 20 and the body structure, wherefore the charged bellows serve to cushion the body structure against road shock and vibration. Any excessive tendency of the body structure to sway laterally will be countered by both the charged bellows and the helical springs 24 which are provided in part for that purpose and which extend vertically between the side frames and a lower portion of the end plates 42, outwardly of the bellows 39 in adjacent pairs at each end of the side frames.

While Fig. 6 is a diagrammatic view of a suspension system, in actual practise the charging and vent valves are preferably of a type having actuating levers and are mounted, for example, on the truck frame so that the actuating levers of the charging valves are engaged and moved to open position by a portion of the body structure when the same moves downwardly beyond a predetermined limit due to shock or increased load. Conversely, the vent valves may be so arranged that the actuating levers thereof will be engaged and moved to open position by a portion of the body structure when the same moves upwardly beyond a predetermined limit due to shock or decreased load. The pneumatic system therefore serves to compensate for load variations and to dampen the effects of shock and vibration.

In view of the present construction which, as shown, embodies outboard bearings, it will be noted that while the springs 24 assist in maintaining vertical equilibrium, as stated herein, Fig. 9 illustrates that they also serve in case of pneumatic blow out, to maintain wheel-to-rail engagement where the rails are not at the same level. In that figure, the broken lines illustrate a frequent result of one rail dropping below the level of the other. One wheel disengages from the rail and enables the opposite wheel to ride off its rail to effect derailment. The springs 24 urge the side frames downwardly and the wheels into rail engaging position, as shown by the solid lines in Fig. 9, to thereby minimize the possibility of derailment when the rails are not at the same level. It will be noted that no derailment would occur where helical springs are substituted for the pneumatic springs.

Vertical and lateral movement of the body structure with respect to the unsprung portion of the truck frame due to shock, for example, is permitted by the links or arms 54 and 57, which, because of the manner in which they are mounted, allow a permissible amount of such movement. It will be noted that these same links or arms also serve to restrain or control longitudinal movement of the body structure with respect to the unsprung portion of the truck frame, and to resist brake reaction. The sprung portion of the truck however, comprising the tubular member 40 and the structure 41, 42, 44, 46, 65 fixedly connected thereto, has limited freedom of horizontal movement relative both to the car body and to the unsprung portion of the truck, and thus may seek its natural seat on the springs, accommodating momentarily to lateral, vertical, and oblique shocks. Also very importantly, the member 40 may move longitudinally of the car, that is to say transversely of the axles 29, relative to said axles, providing cushioning of braking shocks and freedom of the axles to follow curves, in which case the opposite ends of the axle have opposite movement longitudinal of the car relative to the respective adjacent member 40.

The hangers 20, which are inclined downwardly and outwardly, serve to center the body structure and to permit some lateral swinging movement thereof, but the stabilizing means 21, acting as parallel motion mechanisms, maintain the tubular members 40 free from rotary movement about their own longitudinal axes. In other words, as the bellows are expanded under inflation or due to load lifting shocks and contracted due to venting or load lowering shocks, the end flanges thereof will be maintained in parallel planes to minimize stresses in the bellows walls due to lateral bending.

If desired, lateral body structure movement may be more positively limited by stops comprising a pair of closely spaced brackets 59 integrally secured adjacent the center of at least one of the end pieces 35 and having facing surfaces upon which may be mounted rubber pads 60. Suitably secured to a convenient portion of the corresponding depending member 11, a tongue 61 may project into the jaw between the pads 60.

Similarly, in the event of a blow out or unusually violent jouncing, downward movement of the body structure is positively limited by providing a supporting member 62 having an upwardly facing surface along the end portions of each end piece 35 and rubber padding 64 secured to the upper surface thereof for engagement by a foot 65 formed at the lower portion of the end plates 42 at the ends of the tubular members 40, as best shown in Figs. 2 and 5.

Figs. 6 and 7 illustrate the pneumatic means arranged for four point suspension, but it will be noted that a three point suspension system may be readily provided, if desired, by simply interconnecting the two independent suspension means of one truck in each two truck car. This may be done, for example, by providing a valved line between end pieces 35 or by using a single charging valve to charge both end pieces of one truck simultaneously.

From the foregoing description, it will be seen that the present invention provides a simple, compact, relatively light weight and inexpensive truck having desired running characteristics, efficiency, and reliability, and which transmits a minimum of shock and vibration at high or low speeds, requires little maintenance and provides easy access to the various parts for inspection and replacement.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. A vehicle body supporting truck comprising a wheel and axle assembly, spaced side frames mounted by journal bearings at each end of said assembly, hollow end pieces connecting corresponding ends of said side frames and forming therewith a truck frame, said end pieces having closed ends to provide pneumatic reservoirs, pneumatic spring means including a vertically yieldable chamber supported by each of said side frames, each of said yieldable chambers having a rigid chamber mounted thereon and in communication therewith, conduit means effecting communication between each respective end piece and one of said yieldable chambers, and hanger means pivotally mounted on said rigid chamber for supporting the vehicle body structure therefrom.

2. A vehicle body supporting truck according to claim 1 wherein helical spring means are disposed between each of said side frames and its respective rigid chamber means.

3. A vehicle truck according to claim 1 wherein stop means are mounted on at least one of said end pieces to engage a portion of said vehicle body structure to limit lateral movement thereof.

4. A vehicle body supporting truck comprising a wheel and axle assembly, a truck frame including spaced side frames mounted by journal bearings at each end of said assembly and end pieces connecting corresponding ends of said side frames, pneumatic spring means including a vertically yieldable chamber supported by each of said side frames, elongated, horizontally extending rigid chamber means mounted on each of said yieldable chambers for vertical movement and in communication therewith, stabilizing means mounted on said end pieces and pivotally connected to each of said rigid chamber means to constrain the latter from rotation about their longitudinal axes and hanger means pivotally mounted on said rigid chamber means for supporting the vehicle body structure therefrom.

5. A vehicle body supporting truck comprising a wheel and axle assembly, spaced side frames mounted by journal bearings at each end of said assembly, hollow end pieces connecting corresponding ends of said side frames and forming therewith a truck frame, said end pieces having closed ends to provide pneumatic reservoirs, pneumatic spring means including a vertically yieldable chamber supported by each of said side frames, rigid chamber means mounted on each of said yieldable chambers for vertical movement and in communication therewith, conduit means effecting communication between each respective end piece and one of said yieldable chambers, stabilizing means mounted on said end pieces and pivotally connected to each of said rigid chamber means, and hanger means pivotally mounted on said rigid chamber means for supporting the vehicle body structure therefrom.

6. A vehicle body supporting truck comprising a wheel and axle assembly, spaced side frames mounted by journal bearings at each end of said assembly, hollow end pieces connecting corresponding ends of said side frames and forming therewith a truck frame, said end pieces having closed ends to provide pneumatic reservoirs, pneumatic spring means including a vertically yieldable chamber supported by each of said side frames, rigid chamber means mounted on each of said yieldable chambers and in communication therewith, conduit means effecting communication between each respective end piece and one of said yieldable chambers, hanger means pivotally mounted on said rigid chamber means for supporting the vehicle body structure therefrom, and vertical movement control means pivotally connected to each of said side frames and to the body structure.

7. A vehicle body supporting truck according to claim 6, wherein stop means are provided on said rigid chamber means and on said truck frames to limit vertical movement of the body structure.

8. A vehicle body supporting single axle truck comprising a wheel and axle assembly, spaced side frames mounted by journal bearings at each end of said assembly, hollow end pieces connecting corresponding ends of said side frames and forming therewith a truck frame, said end pieces having closed ends to provide pneumatic reservoirs, pneumatic spring means including a vertically yieldable chamber supported by each of said side frames, rigid chamber means mounted on each of said yieldable chambers and in communication therewith, conduit means effecting communication between each respective end piece and one of said yieldable chambers, hanger means pivotally mounted on said rigid chamber means for supporting the vehicle body structure therefrom, and restraining means pivotally connected to each of said side frames and to the body structure to restrain longitudinal movement of the body structure with respect to the unsprung portion of the truck frame.

9. A vehicle body supporting truck comprising a wheel and axle assembly, a truck frame including spaced side frames mounted by journal bearings at each end of said assembly and end pieces connecting corresponding ends of said side frames, spring means supported by each of said side frames, a rigid member carried by each of said spring means, hanger means pivotally mounted on said rigid members for supporting the vehicle body structure therefrom, stop means comprising spaced brackets mounted on at least one of said end pieces, and a tongue projecting from said vehicle body structure engageable with said brackets to limit lateral movement thereof.

10. A vehicle body supporting truck comprising a wheel and axle assembly, a truck frame including spaced side frames mounted by journal bearings at each end of said assembly and end pieces connecting corresponding ends of said side frames, spring means supported by each of said side frames, a rigid member carried by each of said spring means, hanger means pivotally mounted on said rigid members for supporting the vehicle body structure, and stabilizing means mounted on said end pieces and pivotally connected to each of said rigid members to constrain the latter against rotation about their longitudinal axes.

11. A vehicle body supporting truck comprising a wheel and axle assembly, a truck frame including spaced side frames mounted by journal bearings at each end of said assembly and end pieces connecting corresponding ends of said side frames, spring means supported by each of said side frames, a rigid member carried by each of said spring means, hanger means pivotally mounted on said rigid members for supporting the vehicle body structure, stabilizing means mounted on said end pieces and pivotally connected to each of said rigid members, and longitudinal movement control means comprising parallel arms pivotally connected at one end to said side frames and at their other end to said body structure.

12. A vehicle body supporting suspension system comprising a wheel and axle assembly, spaced side frames mounted by journal bearings at each end of said assembly, tubular end pieces connecting corresponding ends of said side frames and forming therewith a truck frame, said end pieces having closed ends to provide pneumatic reservoirs, pneumatic spring means including a vertically yieldable chamber supported by each of said side frames, rigid means mounted on each of said yieldable chambers, pneumatic pressure medium supply means, means establishing communication between said supply means and each of said tubular end pieces, normally closed charging valve means in each of said last mentioned means, normally closed vent valve means associated with each of said end pieces adapted to vent pressure medium to atmosphere, and hanger means pivotally mounted on said rigid means for supporting the vehicle body structure therefrom.

13. A vehicle body supporting suspension system comprising a wheel and axle assembly, spaced side frames mounted by journal bearings at each end of said assembly, tubular end pieces connecting corresponding ends of said side frames and forming therewith a truck frame, said end pieces having closed ends to provide pneumatic reservoirs, pneumatic spring means including a vertically yieldable chamber supported by each of said side frames, rigid chamber means mounted on each of said yieldable chambers and in communication therewith, conduit means effecting communication between each respective end piece and one of said yieldable chambers, pneumatic pressure medium supply means, means establishing communication between said supply means and each of said end pieces, normally closed charging valve means in each of said last mentioned means, normally closed vent valve means associated with each of said end pieces adapted to vent pressure medium to atmosphere, and hanger means pivotally mounted on said rigid chamber means for supporting the vehicle body therefrom.

14. A vehicle body supporting truck comprising a wheel and axle assembly, a truck frame including spaced side frames mounted by journal bearings at each end of said assembly and tubular end pieces connecting corresponding ends of said side frames and having closed ends, pneumatic spring means including a vertically yieldable chamber supported by each of said side frames, rigid chamber means mounted on each of said yieldable chambers for vertical movement and in communication therewith, conduit means effecting communication between each respective end piece and one of said yieldable chambers, stabilizing means including pairs of spaced parallel links, each pair pivotally connected at one end to an end of one of said rigid chamber means and at the other end to a rigid post member mounted on one of said end pieces, and hanger means pivotally mounted on said rigid chamber means for supporting the vehicle body structure therefrom.

15. A vehicle body supporting truck comprising a wheel and axle assembly, a truck frame including spaced side frames mounted by journal bearings at each end of said assembly and tubular end pieces connecting corresponding ends of said side frames and having closed ends, pneumatic spring means including a vertically yieldable chamber supported by each of said side frames, rigid chamber means mounted on each of said yieldable chambers and in communication therewith, conduit means effecting communication between each respective end piece and one of said yieldable chambers, hanger means pivotally mounted on said rigid chamber means for supporting the vehicle body structure therefrom, stabilizing means associated with said truck including pairs of spaced parallel links, each pair pivotally connected at one end to an end of one of said rigid chamber means and at the other end to a rigid post member mounted on one of said end pieces, and vertical movement control means pivotally connected to each of said side frames and to the body structure.

16. A vehicle body supporting truck comprising a wheel and axle assembly, a truck frame including spaced side frames mounted by journal bearings at each end of said assembly and end pieces connecting corresponding ends of said side frames, spring means supported by each of said side frames, a rigid member carried by each of said spring means, hanger means pivotally mounted on said rigid members for supporting the vehicle body structure, and stabilizing means including pairs of spaced parallel links, each pair pivotally connected at one end to an end of one of said rigid members and at the other end to a rigid post member mounted on one of said end pieces.

17. A vehicle body supporting suspension system comprising a wheel and axle assembly, a truck frame including spaced side frames mounted by journal bearings at each end of said assembly and tubular end pieces connecting corresponding ends of said side frames and having closed ends, pneumatic spring means including a vertically yieldable chamber supported by each of said side frames, rigid chamber means mounted on each of said yieldable chambers and in communication therewith, conduit means effecting communication between said respective end piece and one of said yieldable chambers, pneumatic pressure medium supply means, means establishing communication between said supply means and each of said end pieces, normally closed charging valve means in each of said last mentioned means, normally closed vent valve means associated with each of said end pieces adapted to vent pressure medium to atmosphere, and hanger means pivotally mounted on said rigid chamber means for supporting the vehicle body therefrom, said charging valve means and said vent valve means being operable by the relative movement of the body with respect to said truck frame.

18. A vehicle body supporting truck comprising a wheel and axle assembly, a side frame mounted by a journal bearing at each end of said assembly, means fixedly connected to both side frames and extending therebetween and maintaining said side frames in spaced parallel relation one to the other, each of said side frames having mounted thereon pneumatic spring means including a vertically extending and vertically yieldable chamber, said chamber being constructed and arranged so that its top portion has freedom of horizontal movement transversely of said axle, said top portion of each of said yieldable chambers having a rigid chamber mounted thereon and in communication therewith, whereby said rigid chamber has freedom of horizontal movement transversely of said axle, and hanger means pivotally mounted on said rigid chamber and suspending the vehicle body therefrom.

19. A vehicle body supporting truck comprising a wheel and axle assembly, a side frame mounted by a journal bearing at each end of said assembly, means fixedly connected to both side frames and extending therebetween and maintaining said side frames in spaced parallel relation one to the other, each of said side frames having mounted thereon pneumatic springs means including a flexible walled vertically yieldable chamber, said chamber being constructed and arranged so that its top portion has freedom of horizontal movement transversely of said axle, said top portion of each of said yieldable chambers having a rigid chamber mounted thereon and in communication therewith, whereby said rigid chamber has freedom of horizontal movement transversely of said axle, and hanger means pivotally mounted on said rigid chamber and suspending the vehicle body therefrom.

20. A vehicle body supporting truck comprising a wheel and axle assembly, a side frame mounted by a journal bearing at each end of said assembly, means fixedly connected to both side frames and extending therebetween and maintaining said side frames in spaced parallel relation one to the other, each of said side frames supporting a spring means, said spring means being constructed and arranged so that its top portion has freedom of horizontal movement transversely of said axle, said top portion of each of said spring means having a rigid member mounted thereon whereby said rigid member has freedom of horizontal movement transversely of said axle, and hanger means pivotally mounted on said rigid member and suspending the vehicle body therefrom.

21. A vehicle body supporting truck comprising a wheel and axle assembly, a side frame mounted by a journal bearing at each end of said assembly, means fixedly connected to both side frames and extending therebetween and maintaining said side frames in spaced parallel relation one to the other, each of said side frames supporting a helical coil spring means, said spring means being constructed and arranged so that its top portion has freedom of horizontal movement transversely of said axle, said top portion of each of said spring means having a rigid member mounted thereon whereby said rigid member has freedom of horizontal movement transversely of said axle, and hanger means pivotally mounted on said rigid member and suspending the vehicle body therefrom.

References Cited in the file of this patent

UNITED STATES PATENTS

| 2,758,549 | Lich | Aug. 14, 1956 |
| 2,773,686 | Nash | Dec. 11, 1956 |

FOREIGN PATENTS

| 708,066 | Great Britain | Apr. 28, 1954 |
| 424,371 | Italy | Aug. 18, 1947 |